United States Patent [19]

Barnett

[11] Patent Number: 4,884,781
[45] Date of Patent: Dec. 5, 1989

[54] TAMPER RESISTANT VALVE ASSEMBLY PRIMARILY ADAPTED FOR SAMPLING OF FLUIDS

[76] Inventor: Burton Barnett, 12592 Martha Ann Dr., Rossmoor, Calif. 90720

[21] Appl. No.: 323,295

[22] Filed: Mar. 14, 1989

[51] Int. Cl.$^4$ .............................................. F16K 21/08
[52] U.S. Cl. ........................................ 251/23; 251/57
[58] Field of Search .................................... 251/23, 57

[56] References Cited

U.S. PATENT DOCUMENTS

| 1,274,195 | 7/1918 | Purnell | 251/23 |
| 3,197,172 | 7/1965 | Brandenberg et al. | 251/23 |
| 3,357,675 | 12/1967 | Brandenberg et al. | 251/23 |

FOREIGN PATENT DOCUMENTS

| 618880 | 9/1935 | Fed. Rep. of Germany | 251/23 |
| 372064 | 5/1932 | United Kingdom | 251/23 |
| 403724 | 1/1934 | United Kingdom | 251/23 |

Primary Examiner—John Rivell
Attorney, Agent, or Firm—Klein & Szekeres

[57] ABSTRACT

A valve assembly is disclosed in which a valve adapted for opening a fluid passage is normally biased into closed position. The valve is opened by movement of a piston operated by hydraulic pressure of a liquid contained in a chamber disposed behind the piston. The hydraulic pressure of the liquid is generated by an actuating force, such as manual depression of a handle. A duct permitting restricted flow of the hydraulic liquid, however permits escape of the hydraulic liquid from the chamber when the hydraulic liquid is pressurized and thereby gradually relieves pressure from the piston even when the actuating force is maintained. The hydraulic liquid escapes into a second chamber from where it returns through a relief valve into the first chamber when there is no actuating force on the handle.

28 Claims, 8 Drawing Sheets

TAMPER RESISTANT VALVE ASSEMBLY PRIMARILY ADAPTED FOR SAMPLING OF FLUIDS

BACKGROUND OF THE INVENTION

1. Field of the Invention

The present invention is in the field of valves. Particularly, the present invention is directed to a valve assembly which after actuation opens only for a predetermined time period and closes even if the initial actuating force remains in effect.

2. Brief Description of the Prior Art

Valves adapted for draining fluids from containers are well known in the prior art. There are many situations and devices where it is desired for a valve to stay open only while an actuating force is in effect. Construction of such valves often included a spring which causes the valve to close once the actuating force is released.

As a further development of the valve assemblies of the above-noted type (which do not stay open indeterminately after they have been opened) the prior art has developed valves which close within a predetermined time period (for example in 10 to 60 seconds) after the opening force is released. Such valve assemblies are sometimes used on water faucets to prevent waste, and are also used frequently in situations where fluid samples are periodically taken from containers. Thus, to actuate such "time limited" valve assemblies, one merely pushes a button, lever or handle (or the like), whereafter the valve stays open for the predetermined time period and then closes automatically. A problem of valve assemblies of this type is that the self-closing feature can be overridden, sometimes for mischievous or malicious reasons, for example by putting a weight on the valve handle, or by otherwise forcing the valve handle to stay in an "open" position. As a result, in many instances dangerously low fluid levels occur in the apparatus or containers to which the valve is mounted, and sometimes serious damage is sustained; even accidents and fires may occur as a result.

In light of the foregoing, there is a need in the prior art for a valve assembly which opens upon actuation for a predetermined time period, and which thereafter closes even if the actuating force remains continuously applied. In other words, there is a need in the prior art for a valve assembly in which the self-closing feature cannot be readily overridden by continuously applying force to the actuating mechanism of the valve. The present invention provides such a valve assembly.

SUMMARY OF THE INVENTION

It is an object of the present invention to provide a valve assembly which is normally closed, and which upon activation opens and closes after a predetermined time period even if the activating force continues to be applied.

It is another object of the present invention to provide a valve assembly which meets the above-stated objective and yet has relatively simple construction and operates with reliability.

The foregoing and other objects and advantages are attained by a valve assembly which has a first fluid duct that is mounted to a container to be in fluid communication with the container. A first valve, which may be a poppet valve, a ball valve, or the like, controls the fluid flow through the first fluid duct, so that when the first valve is opened a sample of the fluid of the container can be taken. The first valve is biased by a suitable biasing device, such as a spring, into a closed position.

The first valve itself is mounted in a hollow interior or bore of a main valve body, and includes a first piston which is moved to open the first valve by pressure of a liquid which is contained in the bore of the main valve body. A first space is disposed behind the first piston in the bore, and the pressure transmitting liquid occupies the first space while the first piston is activated.

A second piston is located in the bore behind the first piston. The second piston is connected to a handle, button, or like actuating means where by force exerted on the second piston is transmitted to the liquid in the first space and therethrough to the first piston to open the first valve. The second piston is biased by a suitable biasing device, such as a spring, not to exert pressure on the liquid unless the biasing force is overriden by an actuating force, such as a manual force on the button or handle.

A channel or duct disposed in the body of the second piston, or in alternative embodiments in the main valve body, is dimensioned to permit only gradual, relatively slow flow of the pressurized liquid from the first space into a second space which is disposed behind the second piston. Flow of the liquid from the first space to the second space gradually releases the pressurized liquid from the first space and relieves the pressure from the first piston, causing the first valve to close. A relief valve associated with the valve assembly, and preferably incorporated in the body of the second piston, allows the liquid to flow back from the second space into the first space when the actuating force is released, thereby readying the valve assembly to operate in another cycle.

The objects and features of the present invention are set forth in the appended claims. The present invention may be best understood, together with further objects and advantages, by reference to the following description, taken in connection with the accompanying drawings, in which like numerals indicate like parts.

DESCRIPTION OF THE PREFERRED EMBODIMENTS

The following specification taken in conjunction with the drawings sets forth the preferred embodiments of the present invention. The embodiments of the invention disclosed herein are the best modes contemplated by the inventor for carrying out his invention in a commercial environment, although it should be understood that various modifications can be accomplished within the parameters of the present invention.

Referring now to FIGS. 1–4, a first preferred embodiment 20 of the valve assembly of the present invention is disclosed in detail. It is noted at the outset that the valve assembly of the present invention is specifically designed for applications where a limited volume of a fluid, usually a liquid, is drawn, from time-to-time from a container, and where the self-closing feature of the valve-assembly should remain operative even when a manual actuator handle or button of the valve is kept depressed. In the accompanying drawings the valve assembly is shown operatively connected to a container 22, and in the ensuing description the fluid of the container is referred to as liquid 24. Nevertheless, it should be understood that the invention is not so limited, and the valve assembly can also be used in connection with gases (not shown).

Referring now again specifically to FIGS. 1–4, and particularly to FIG. 1, the valve assembly 20 includes a main valve body 25 which has a hollow interior bore 28. One end of the main valve body 26 terminates in a nipple 30 having male threads 32 through which the valve assembly 20 is mounted to be in fluid communication with the container 22. A threaded opening 34 provided in the mid-section of the valve body 26 receives an outlet tube 36 through which liquid 24 can flow through the valve assembly 20 from the container 22 into a collecting dish 38. The collecting dish 38 is schematically shown on FIGS. 2 and 3 of the drawings.

A valve seat 40 is formed in the interior bore 28 of the valve body 26, and a valve poppet 42 seals against the valve seat 40. As is apparent from an inspection of FIGS. 1–4, the valve seat 40 and poppet 42 combination forms a poppet valve which is capable of shutting-off flow of the liquid 24 in the valve assembly 20. The poppet 42 is carried by a first piston 44 which is disposed for longitudinal, axial movement within the bore 28 of the valve body 26. A spring 46 is mounted against an interior shoulder 48 within the bore 28 of the valve body 26 to bias the poppet 42 into the position shown on FIGS. 1, 3 and 4 wherein the poppet 42 seals against the valve seat 40.

A first space or chamber 50 is disposed behind the first piston 44. As is shown on FIG. 1, this chamber 50 normally contains a pressurizing or hydraulic liquid 52. A second piston 54 is mounted within the bore 28 behind the first space or chamber 50. The second piston 54 comprises a first portion 56 which slides in the interior bore 28, and an actuator rod 58 which protrudes from the valve body 26. An actuator handle 60 is pivotably mounted to the valve body 26, and is also mounted to the actuator rod 58, so that pressing the handle 60 causes the actuator rod 58 and the second piston 54 to move downward within the bore 28 of the valve body 26. A second spring 62 biases the handle 60, with the second piston 54 in a direction away from the first piston 44.

A second space or chamber 64 is disposed behind the second piston 54. The second chamber 64, just like the first chamber 50, may contain hydraulic liquid 52. Whether the chamber 64 actually contains hydraulic liquid depends on the operational state of the valve assembly 20. This will become readily apparent from the ensuing description. An idler piston or idler 66 is disposed in the bore 28 behind the second piston 54 and second space 64. O-rings 68 made from suitable resilient or elastic materials (which are well known in the art) seal the idler piston 66 against the bore 28 and against the centrally disposed actuator rod 58. Moreover, O-rings 70 also seal the first and second pistons 44 and 54 against the bore 28.

It should be apparent from the foregoing description, taken together with drawing FIGS. 1 through 4, that the poppet valve 42 is normally held in the closed position, and is activated to open to allow liquid 24 to flow through the valve assembly 20 by pressing the handle 60 while overcoming the biasing force of the springs 46 and 62. More particularly, when the handle 60 is pressed, the second piston 54 moves in the bore 28 pressurizing the hydraulic liquid 52, and thereby, through the hydraulic liquid 52, also pushing the first piston 44. The first piston 44 carries the poppet 42 and thereby opens the poppet valve. The poppet valve is depicted on FIG. 2 of the appended drawings in open condition, while the handle 60 is depressed.

Figure 1:
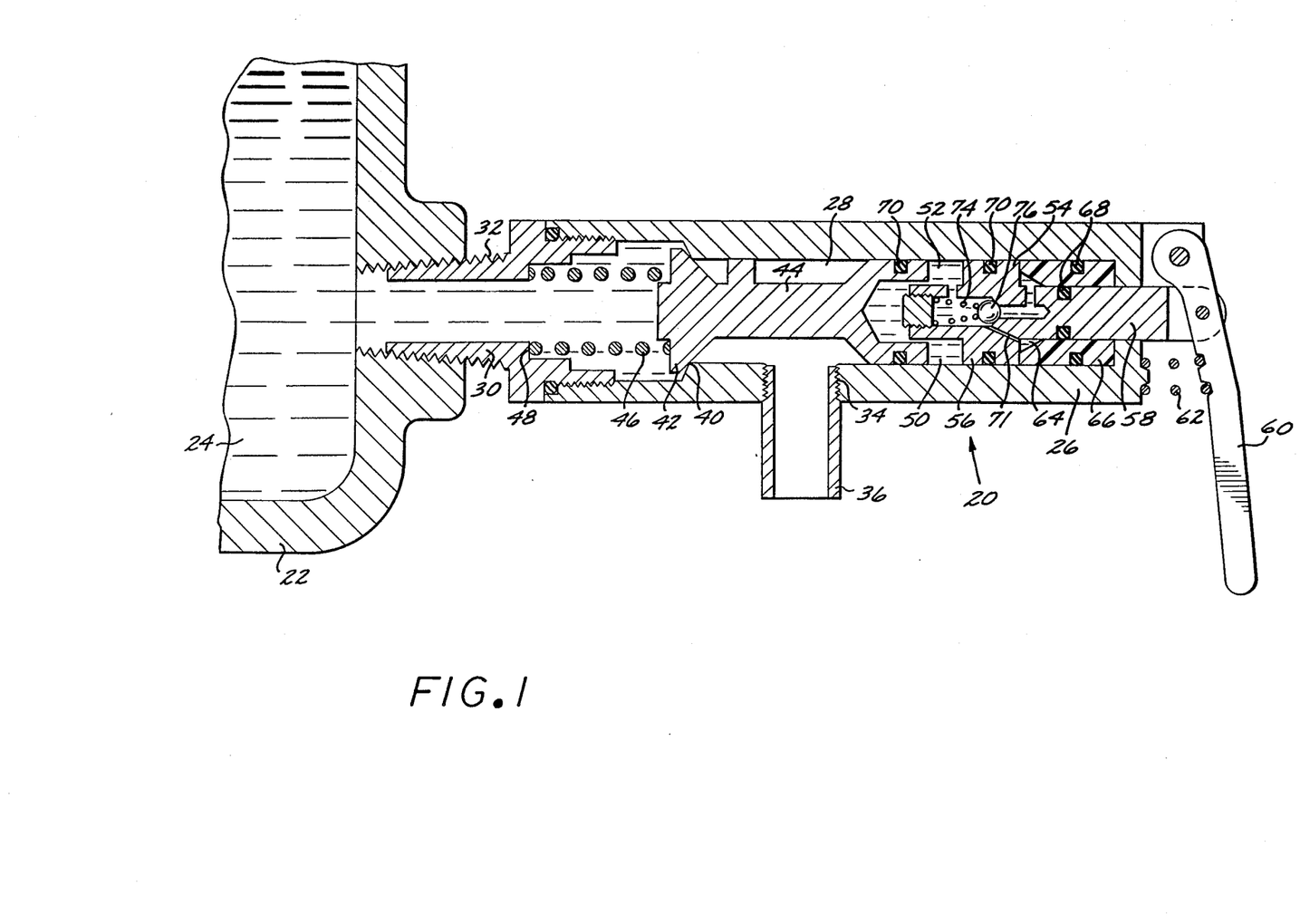
FIG. 1 is a cross-sectional view of a first preferred embodiment of the valve assembly of the present invention, the view showing an idle actuator handle, and the valve assembly in closed position.
Figure 2:
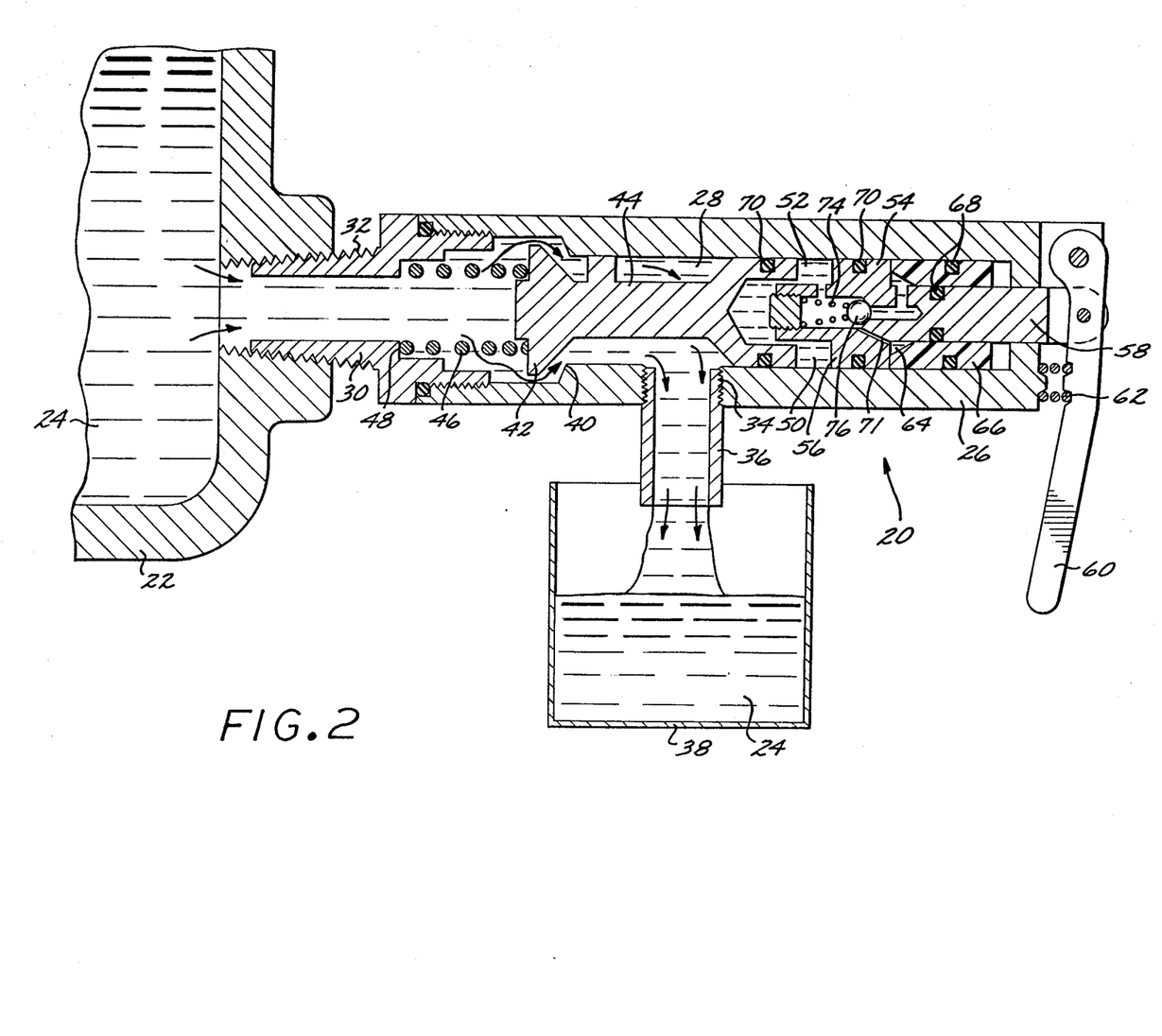
FIG. 2 is a cross-sectional view of the first preferred embodiment of the valve assembly of the present invention, the view showing the actuator handle activated and the valve assembly in open position.
Figure 3:
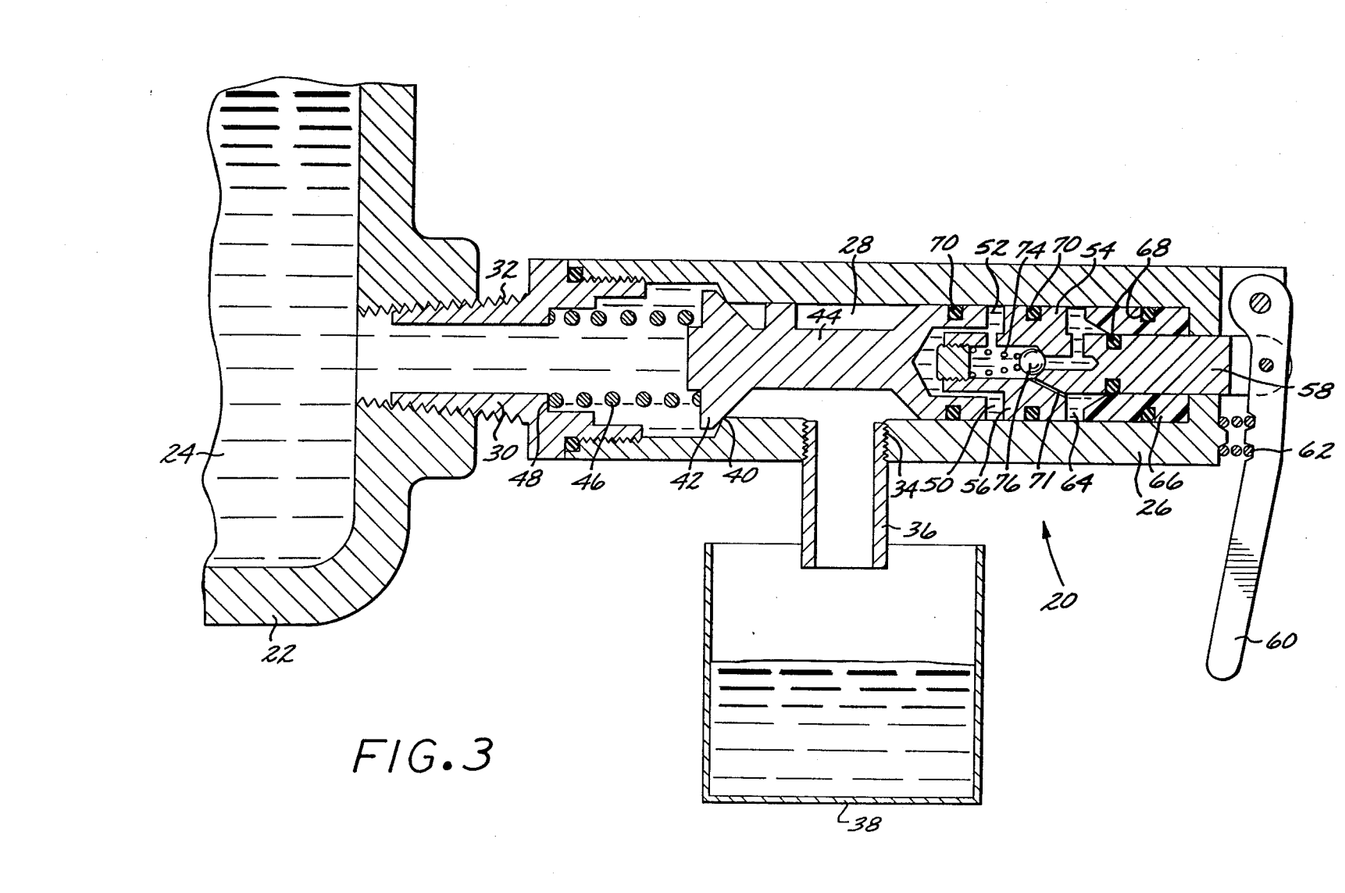
FIG. 3 is a cross-sectional view of the first preferred embodiment of the valve assembly of the present invention, the view showing the actuator handle activated and the valve assembly nevertheless in a closed position.
Figure 4:
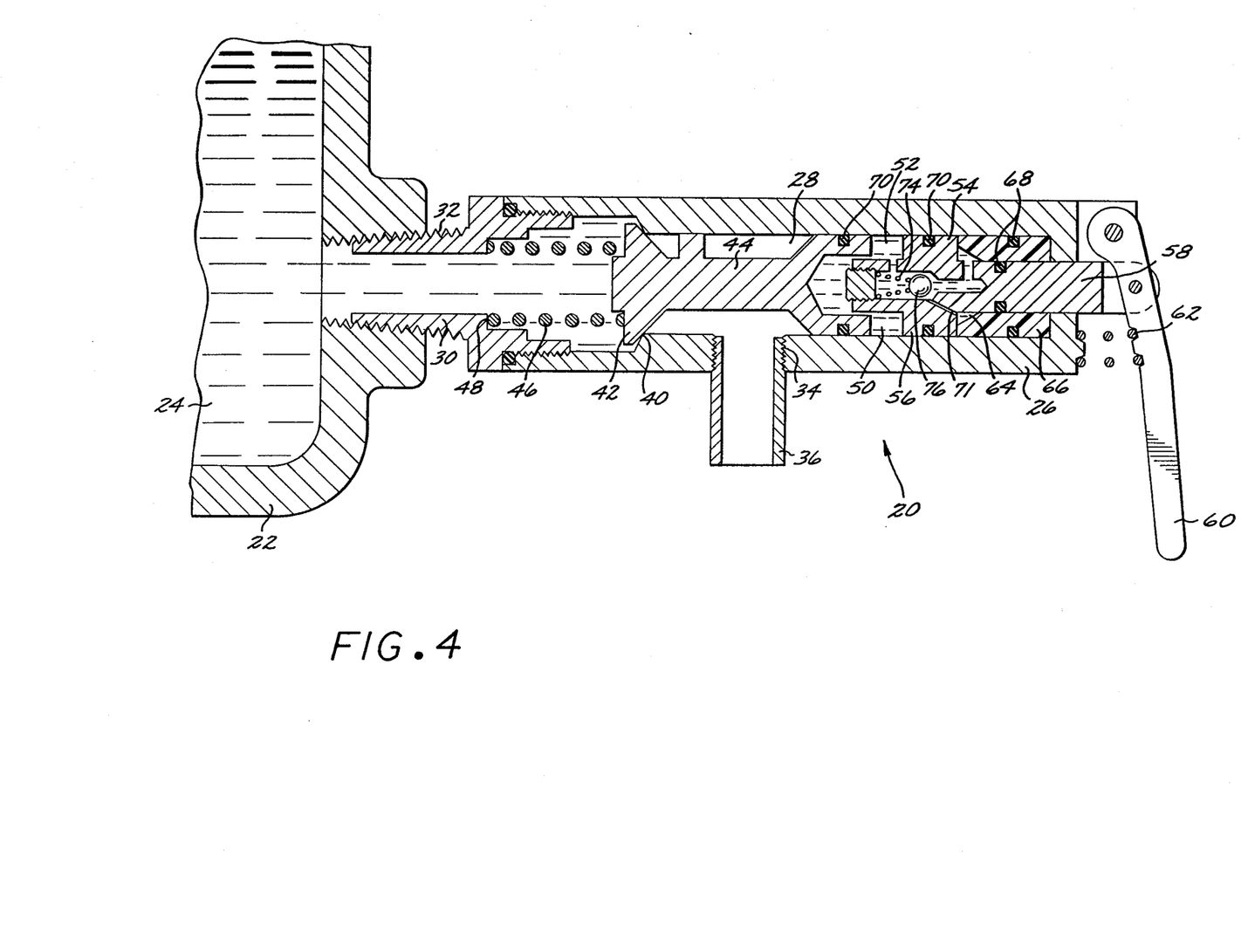
FIG. 4 is a cross-sectional view of the first preferred embodiment of the valve assembly of the present invention, the view showing the actuator handle released into the idle position and the valve assembly in a closed position.
Figure 5:
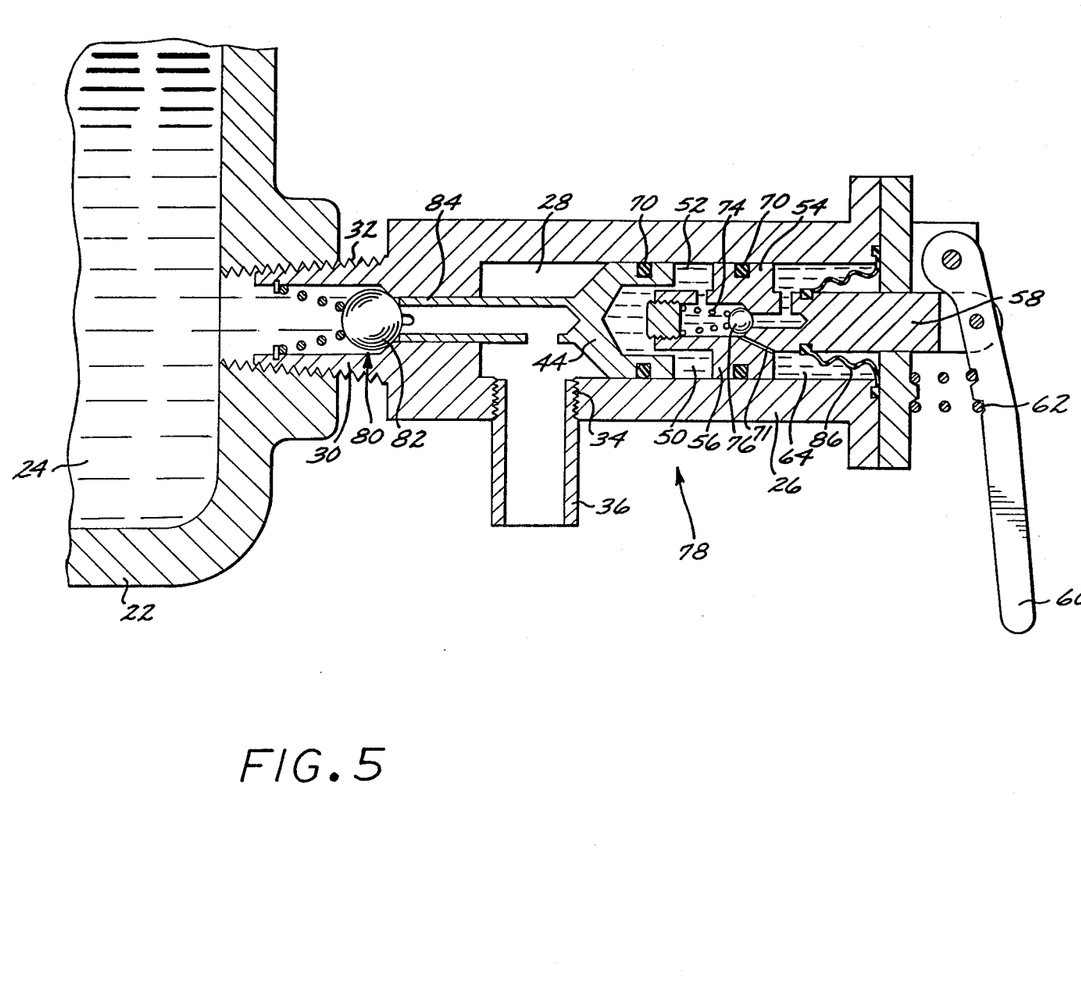
FIG. 5 is a cross-sectional view of a second preferred embodiment of the valve assembly of the present invention, the view showing the actuator handle idle, and the valve assembly in closed position.
Figure 6:
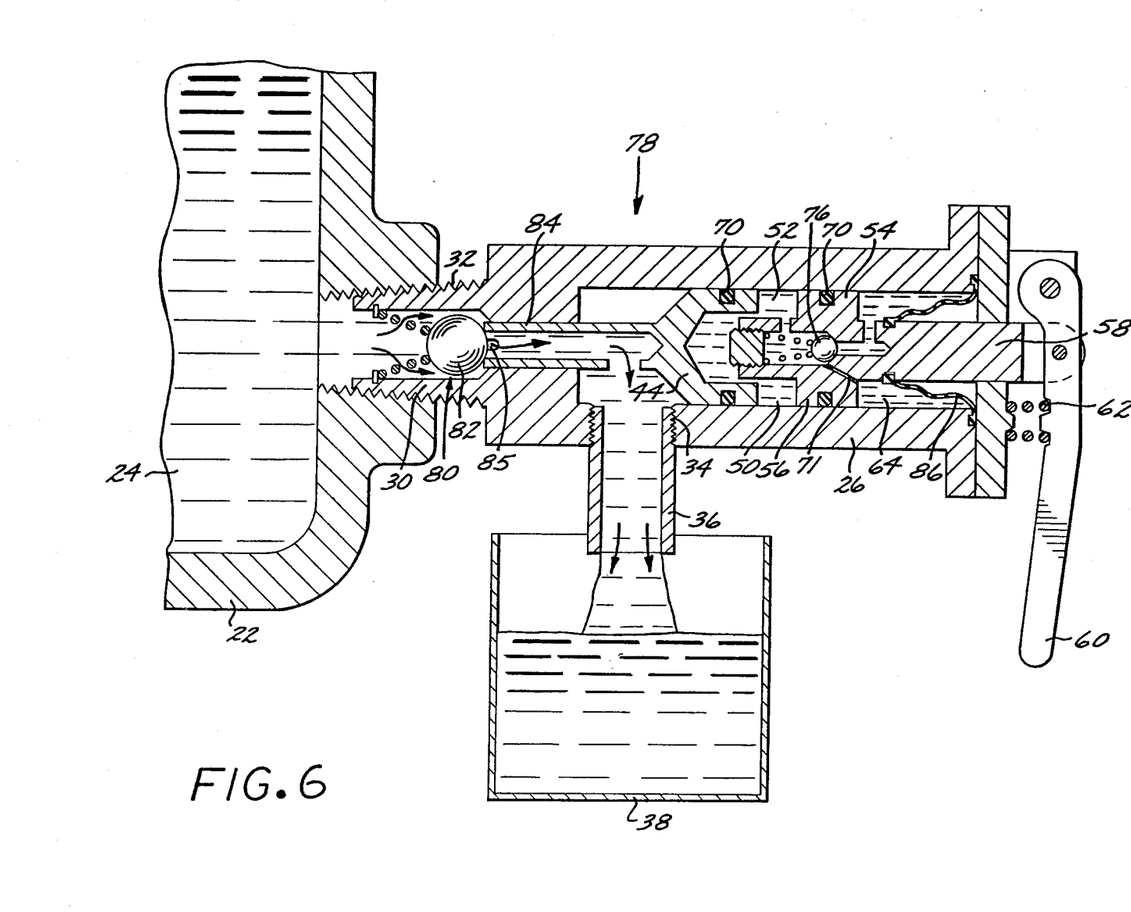
FIG. 6 is a cross-sectional view of a second preferred embodiment of the valve assembly of the present invention, the view showing the actuator handle activated, and the valve assembly in open position.
Figure 7:
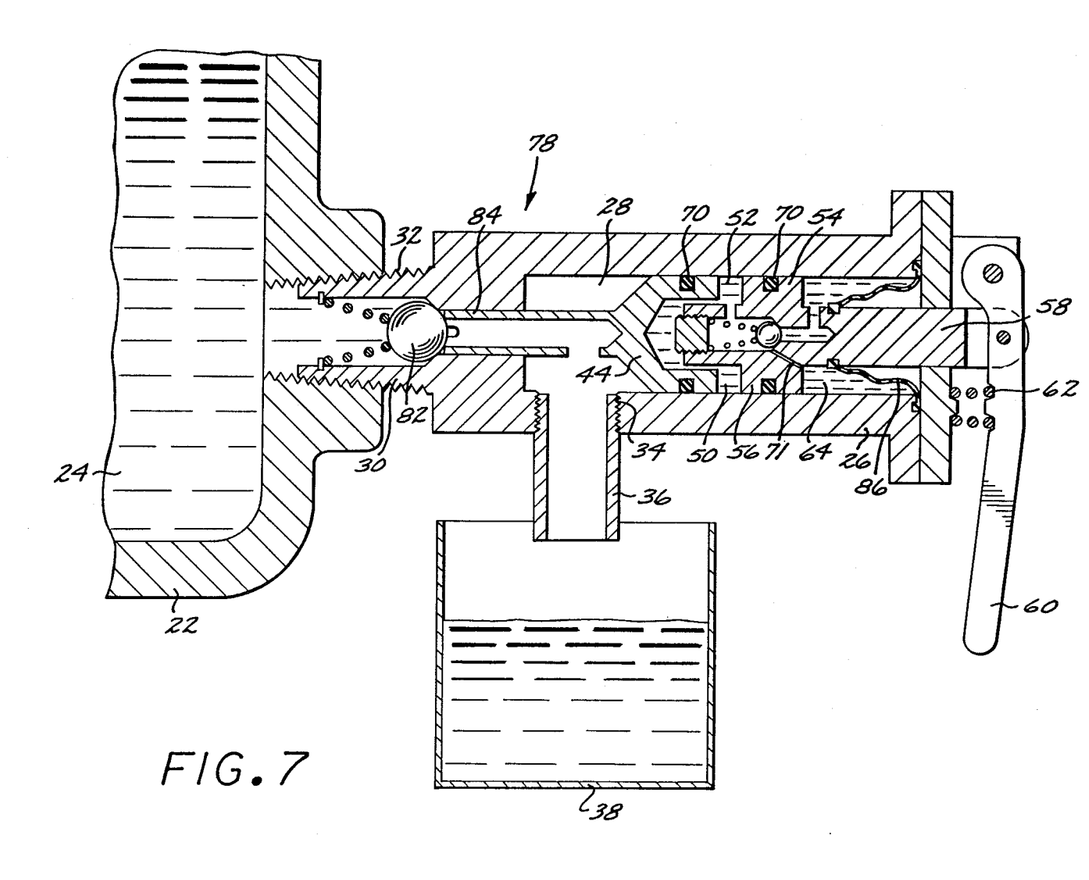
FIG. 7 is a cross-sectional view of the second preferred embodiment of the valve assembly of the present invention, the view showing the actuator handle activated and the valve assembly nevertheless in a closed position.
Figure 8:
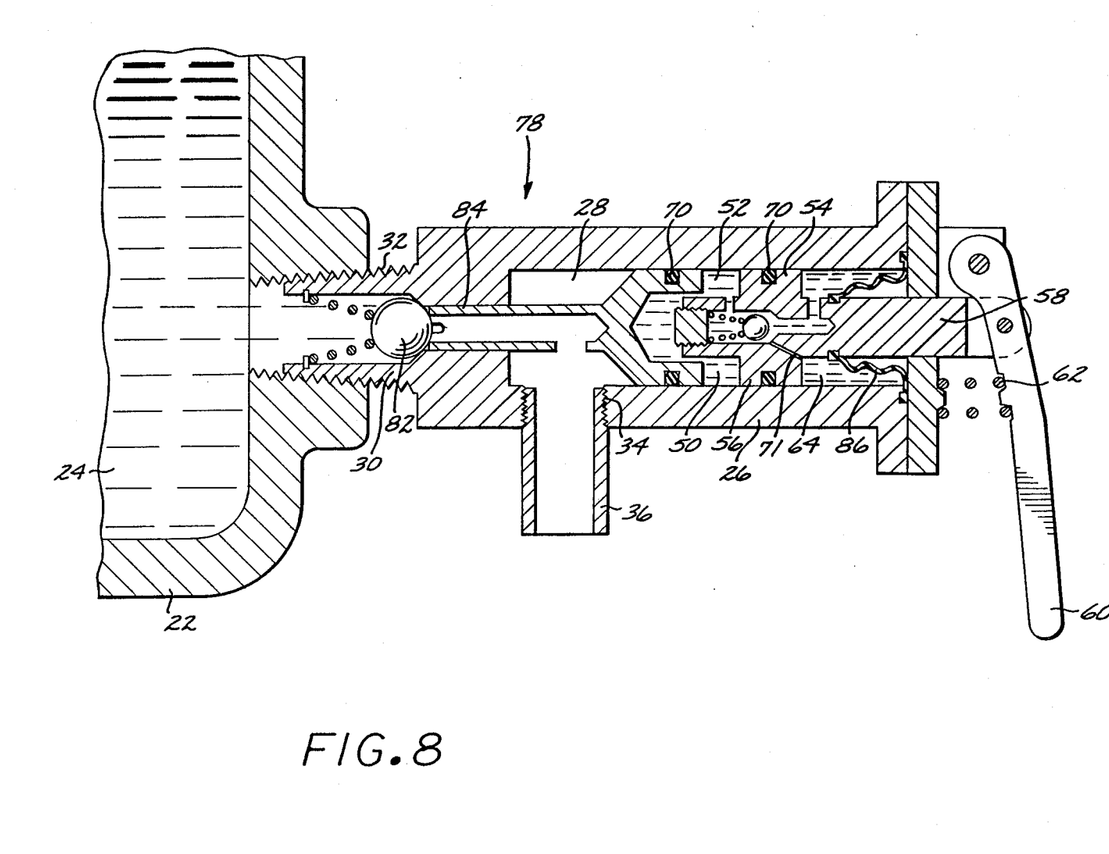
FIG. 8 is a cross-sectional view of the second preferred embodiment of the valve assembly of the present invention, the view showing the actuator handle released into the idle position and the valve assembly in a closed position.

In order to provide the desired, advantageous self-closing and tamper-resistant features to the valve assembly 20 of the present invention, a fluid passage or duct 71 is formed between the first and second spaces 50 and 64 to permit the gradual and relatively slow escape of pressurized hydraulic liquid 52 from the first chamber 50 into the second chamber 64. In other words, a mechanism is provided whereby the hydraulic pressure on the piston 44 (which controls the valve poppet 42) is gradually released, in a desired, substantially predetermined time period, which may, for example, range from a few seconds to several minutes, or longer. In the herein described preferred embodiments of the invention, the duct 71 is disposed within the body of the second piston 54. It should be readily apparent from the foregoing, that after a predetermined volume of pressurized hydraulic liquid 52 has escaped from the first chamber 50, the biasing force of the spring 46 pushes the poppet 42 back to the valve seat 40, thereby shutting the flow of the liquid 24 through the valve assembly 20. FIG. 3 depicts such closed condition of the valve assembly 20, with a substantial amount of hydraulic liquid 52 already transferred from the first chamber 50 to the second chamber 64 through the duct 71, while the handle 60 is in a depressed, "actuated" state.

The idler piston 66 serves the function of sealing the hydraulic liquid 52 in the interior bore 28. In this connection it is noted that while the second piston 54 moves to dislodge the poppet 42 from the valve seat 40 (as is shown on FIG. 2) the resulting "suction effect" also moves the idler piston 66 downward in the bore 28. Moreover, when the pressurized hydraulic liquid 52 escapes from the first chamber 50 into the second chamber 64 (as is shown on FIG. 3) the idler piston 66 simply moves upward, expelling air from the bore 28 through a gap or manufacturing tolerance around the actuator rod 58.

FIG. 3 reveals that after closure of the poppet valve due to escape of hydraulic liquid 52 from the chamber 50 behind the piston 44 (which controls the poppet 42) the actuator handle 60 may remain depressed, but the valve assembly 20 nevertheless stays closed. Consequently, the valve assembly 20 of the present invention is resistant to inadvertent or malicious tampering by continued application of force on the handle 60.

As it will be readily appreciated from the foregoing description taken together with the drawings, the valve assembly stays open after each actuation of the handle 60 for as long as it takes for enough hydraulic liquid 52 to escape to relieve the pressure on the poppet 42, enabling it to close. The length of this time period, in turn, depends on the viscosity of the hydraulic liquid 52, and on the dimensions of the duct 71. More particularly, restrictions, in some embodiment restrictions adjustable in size, may control the overall flow rate in the duct 71. In this regard it is noted that differing applications and uses of the valve assembly 20 may require the use of different hydraulic liquids 52. The temperature of the valve assembly's intended use naturally affects the viscosity of the hydraulic liquid 52. Conversely, in accordance with the present invention the time period for which the valve remains open after actuation may be controlled by selecting hydraulic liquids of different viscosities. Still further, the selection of the hydraulic liquid used in any particular valve assembly of the present invention may also be dictated by the nature of the liquid 24 (or fluid) contained in the container 22; for example when the container contains beverages or other liquids for human consumption, then health laws and/or hygienic and safety considerations may foreclose the use of certain hydraulic liquids which contain materials hazardous to human health.

Referring now back again to FIGS. 1-4 of the appended drawings, the second piston 54 incorporates a relatively wide channel or duct 74 which contains a spring loaded ball valve 76. The channel 74 establishes fluid communication between the first and second chambers 50 and 64. The flow of the hydraulic liquid 52 is, however, controlled by the spring loaded ball valve 76 which acts as a relief valve, and permits flow of the hydraulic liquid 52 from the second space 64 into the first space 50 when the actuating force on the handle 60 is released. This is shown on FIG. 4, where the actuator rod 58 and the second piston 54 are biased by the spring 62 to exert pressure on the liquid 52 in the second chamber or space 64. The relief valve 76 opens as a result, and the hydraulic liquid 52 relatively rapidly flows back through channel 74 into the first chamber or space 50, thereby readying the valve assembly 20 for another cycle of operation.

FIGS. 5 through 8 disclose a second preferred embodiment 78 of the valve assembly of the present invention. The second preferred embodiment 78 is similar in many respects, structurally and with respect to principles of operation, to the first preferred embodiment 20, and is therefore described here only briefly, with emphasis on certain differences between the two embodiments. Thus, the second preferred embodiment 78 includes a spring loaded ball valve assembly 80 mounted to operate in connection with the first, hydraulically activated piston 44. As is shown on the drawing FIGS. 5-8, the ball 82 of the ball valve assembly 80 is dislodged by the first piston 44 to permit a liquid sample 24 to be taken from the container 22, when the handle 60 is depressed. This is shown on FIG. 6. In this embodiment 78 the first piston 44 has a hollow portion 84 to permit flow of the liquid sample 24 through the hollow portion 84 into the outlet tube 36 and into the collecting dish 38. The first piston 44 has a castellated end 85 to permit flow of the liquid 24 into the hollow portion 84 when the ball valve 80 is opened.

Another structural difference between the first and second embodiments is that in the second embodiment 78 the interior bore 28 is sealed, instead of with an idler piston 66, with a flexible diaphragm 86.

Advantages of the above-disclosed invention, as particularly described in connection with the two exemplary specific embodiments, should be readily apparent in light of the disclosure. The principal advantage which is emphasized here is that the valve assembly of the present invention operates in cycles: each time the valve assembly is actuated (for examples by pressing down on the handle) the valve assembly opens and fluid flows only for a predetermined time. Thereafter the valve assembly closes, and fluid flow is shut-off regardless whether or not the handle 60 is kept actuated. In order to ready the valve assembly for another cycle of operation, the handle 60 must first be released and depressed again.

Several modification of the above described invention may become readily apparent to those skilled in the art in light of the foregoing disclosure. Accordingly, the scope of the present invention should be interpreted solely from the following claims, as such claims are read in light of the disclosure.

What is claimed is:

1. A valve assembly which upon activation remains open only for a predetermined time period and is therefore primarily adapted as a fluid sample valve, the valve assembly comprising:
   a valve body having a hollow interior;
   a first fluid duct adapted for being in fluid communication with a container for a fluid and leading to the exterior;
   first valve means for controlling fluid flow through the first fluid duct, the first valve means being normally biased by a first biasing means into a closed position to shut-off fluid flow through the first fluid duct, the first valve means including a first piston which is movably mounted in the hollow interior of the valve body;
   a pressure transmitting liquid disposed in the hollow interior of the valve body behind the first piston, the liquid when pressurized comprising means for actuating the first valve means through the first piston into an open position;
   a second piston movably mounted into the hollow interior of the valve body, a first chamber for the pressure transmitting liquid being disposed in the hollow interior between the first piston and the second piston, the second piston comprising means for pressurizing the liquid whereby the first valve means is actuated into an open position;
   means for gradually releasing the pressurized liquid from the first chamber whereby the pressure is relieved from the first valve means and whereby the first valve means closes, the pressurized liquid being released into a second chamber disposed in the hollow interior behind the second piston;

seal means disposed for closing the second chamber and sealing the liquid within the hollow interior of the valve body;

second biasing means normally biasing the second piston into a position wherein liquid in the first chamber is not pressurized, the second biasing means being overcome by force when the second piston is actuated to pressurize the liquid, and second valve means disposed between the first and second chamber for permitting flow of the liquid from the second chamber to the first chamber when the second piston is biased by the second biasing means.

2. The valve assembly of claim 1 wherein the first valve means comprises the first piston and a valve poppet, and wherein the first fluid duct includes a valve seat, the poppet sealing against the valve seat in the closed position of the first valve means.

3. The valve assembly of claim 1 further comprising an actuator handle pivotably mounted to the valve body and operatively mounted to the second piston, the handle comprising means for actuating the second piston when the handle is manually depressed by a user.

4. The valve assembly of claim 1 wherein the seal means comprise an idler mounted to slide within the hollow interior behind the second piston, the second chamber being formed between the idler and the second piston.

5. The valve assembly of claim 4 wherein the second piston is mounted to an actuator rod, and wherein the idler is disposed in the hollow interior riding on the actuator rod.

6. The valve assembly of claim 1 wherein the means for gradually releasing the pressurized liquid comprises a duct within the body of the second piston, the duct establishing slow fluid communication between the first and second chamber.

7. The valve assembly of claim 1 wherein the second valve means comprises a second duct disposed within the second piston and a relief valve mounted into the second duct, the second duct through the relief valve establishing rapid fluid communication between the first and second chamber and the relief valve opening said fluid communication when liquid pressure in the second chamber is greater than a predetermined value.

8. The valve assembly of claim 1 wherein the first and second pistons are coaxially mounted relative to one another in the hollow interior of the valve body.

9. The valve assembly of claim 8 further comprising a manually actuable handle pivotably mounted to the valve body, and wherein the second piston is mounted to an actuator rod which is coaxial with the second piston, and wherein the handle is mounted to the actuator rod.

10. The valve assembly of claim 9 wherein the second biasing means comprise a spring mounted to the valve body and the handle.

11. A valve assembly which upon activation remains open only for a predetermined time period regardless how long the activating force lasts, and is therefore primarily adapted as a fluid sample valve, the valve assembly comprising:

a valve body having an interior bore;

a first fluid duct adapted for being in fluid communication with a container for fluid which is to be sampled from time to time, the first fluid duct having an outlet;

first biasing means;

poppet valve means for controlling the flow of the fluid through the first duct, the poppet valve means being normally biased into a closed position by the first biasing means to shut-off fluid flow through the first duct whereby in the shut-off position of the poppet valve means fluid does not flow to the outlet, the poppet valve means including a first piston movably mounted in the bore of the valve body and carrying a valve poppet;

a valve seat incorporated in the first duct means against which the valve poppet seals in the closed position of the poppet valve means;

a pressure transmitting liquid disposed in the bore of the valve body behind the first piston, the liquid when pressurized comprising means for moving the poppet valve means through the first piston away from the valve seat and thereby into an open position;

a second piston movably mounted into the bore of the valve body, a first space for the pressure transmitting liquid being disposed in the bore between the first piston and the second piston, the second piston comprising means for pressurizing the liquid whereby the poppet valve means is moved into the open position;

means for gradually releasing the pressurized liquid from the first space whereby the pressure is relieved from the first piston of the poppet valve means and whereby the first biasing means closes the poppet valve means, the pressurized liquid being slowly released into a second space disposed in the bore behind the second piston;

seal means disposed for closing the second space and sealing the liquid within the bore of the valve body;

second biasing means normally biasing the second piston into a position wherein liquid in the first space is not pressurized, the second biasing means being overcome by a manual force when the second piston is moved to pressurize the liquid, and relief valve means disposed between the first and second spaces for permitting flow of the liquid from the second space to the first space when the second piston is biased by the second biasing means.

12. The valve assembly of claim 1 wherein the means for gradually releasing the pressurized liquid comprises a duct means between the first and second spaces for permitting gradual flow of the pressurized liquid from the first space into the second space.

13. The valve assembly of claim 13 wherein the duct means are included in the body of the second piston.

14. The valve assembly of claim 14 wherein the relief valve means include a channel in the body of the second piston and a ball valve sealing the channel.

15. The valve assembly of claim 14 wherein the second piston is mounted to an actuating rod, the actuating rod is mounted to a handle which is pivotably mounted to the valve body, the handle being manually activated by a user when opening of the poppet valve means is desired, the handle being biased by the second biasing means.

16. The valve assembly of claim 15 wherein the sealing means comprise an idler piston which is mounted in the bore of the valve body, the idler piston having an interior bore which slidably accommodates the actuating rod.

17. The valve assembly of claim 16 wherein the first and second pistons, the idler piston, and the actuating are all coaxially mounted within the interior bore of the valve body.

18. A valve assembly which upon activation remains open only for a predetermined time period regardless how long the activating force lasts, and is therefore primarily adapted as a fluid sample valve, the valve assembly comprising:
a valve body having an interior bore;
a first fluid duct adapted for being in fluid communication with a container for fluid which is to be sampled from time to time, the first fluid duct having an outlet;
first biasing means;
first ball valve means for controlling the flow of the fluid through the first duct, the ball valve means being normally biased into a closed position by the first biasing means to shut-off fluid flow through the first duct whereby in the shut-off position of the ball valve means fluid does not flow through the outlet, the ball valve means including a first piston movably mounted in the bore of the valve body and an extension of the piston which is capable of unseating a ball of the ball valve means;
a valve seat incorporated in the first duct means against which the ball of the ball valve means seals in the closed position of the ball valve means;
a pressure transmitting liquid disposed in the bore of the valve body behind the first piston, the liquid when pressurized comprising means for moving the first piston to unseat the ball of the ball valve means;
a second piston movably mounted into the bore of the valve body, a first space for the pressure transmitting liquid being disposed in the bore between the first piston and the second piston, the second piston comprising means for pressurizing the liquid whereby the ball of the ball valve means is moved into the unseated position;
means for gradually releasing the pressurized liquid from the first chamber whereby the pressure is relieved from the first piston and whereby the first biasing means closes the ball valve means, the pressurized liquid being slowly released into a second chamber disposed in the bore behind the second piston;
seal means disposed for closing the chamber space and sealing the liquid within the bore of the valve body;
second biasing means normally biasing the second piston into a position wherein liquid in the first chamber is not pressurized, the second biasing means being overcome by a manual force when the second piston is moved to pressurize the liquid, and
relief valve means disposed between the first and second chambers for permitting flow of the liquid from the second chamber to the first chamber when the second piston is biased by the second biasing means.

19. The valve assembly of claim 18 wherein the seal means comprises a diaphragm.

20. The valve assembly of claim 18 wherein the means for gradually releasing the pressurized liquid comprises duct means between the first and second chambers for permitting gradual flow of the pressurized liquid from the first chamber into the second chamber.

21. The valve assembly of claim 20 wherein the duct means comprise a duct in the body of the second piston.

22. The valve assembly of claim 21 wherein the relief valve means include a channel in the body of the second piston and a ball valve sealing the channel.

23. A valve assembly adapted for opening fluid flow for a predetermined time, the valve assembly comprising:
first valve means for controlling flow of fluid in a flow path, the first valve means being biased to normally occupy a position where the flow path of the fluid is closed;
hydraulically activated piston means operatively connected with the first valve means for opening the first valve means when an external force is applied to the piston means, the piston means including hydraulic liquid in a first chamber and a first piston, the hydraulic liquid in the first chamber being in operative contact with the first piston which is connected with the first valve means;
means for gradually removing the hydraulic liquid from the first chamber while the hydraulic liquid is under pressure whereby the piston means closes the first valve means, and
relief valve means for returning hydraulic liquid to the first chamber when there is no external force applied to the piston means.

24. The valve assembly of claim 23 wherein the piston means further comprise a second piston which is actuated by the external force, the second piston comprising means for pressurizing the hydraulic liquid in the first chamber.

25. The valve assembly of claim 24 wherein the means for gradually removing hydraulic liquid comprise a duct having fluid communication with the first chamber.

26. The valve assembly of claim 25 wherein the duct is diposed within the second piston.

27. The valve assembly of claim 26 wherein the relief valve means are disposed in the second piston.

28. The valve assembly of claim 25 further comprising a second chamber into which the hydraulic liquid is gradually removed through the duct.

* * * * *